(12) United States Patent
Shen et al.

(10) Patent No.: US 11,221,725 B2
(45) Date of Patent: *Jan. 11, 2022

(54) VISUAL MINING OF USER BEHAVIOR PATTERNS

(71) Applicant: PayPal, Inc., San Jose, CA (US)

(72) Inventors: Zeqian Shen, San Jose, CA (US); Neelakantan Sundaresan, San Jose, CA (US); Jishang Wei, Davis, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,495

(22) Filed: Mar. 31, 2020

(65) Prior Publication Data
US 2020/0293153 A1   Sep. 17, 2020

Related U.S. Application Data

(63) Continuation of application No. 16/051,471, filed on Jul. 31, 2018, now Pat. No. 10,606,437, which is a continuation of application No. 13/946,903, filed on Jul. 19, 2013, now Pat. No. 10,037,121.

(60) Provisional application No. 61/711,587, filed on Oct. 9, 2012.

(51) Int. Cl.
*G06F 3/0481* (2013.01)
*G06F 16/34* (2019.01)

(52) U.S. Cl.
CPC ............ *G06F 3/0481* (2013.01); *G06F 16/34* (2019.01)

(58) Field of Classification Search
None
See application file for complete search history.

(56) References Cited

U.S. PATENT DOCUMENTS

| | | | |
|---|---|---|---|
| 5,276,771 A * | 1/1994 | Manukian | G06K 9/627 706/25 |
| 7,096,154 B1 | 8/2006 | Andrade-Cetto | |
| 7,266,510 B1 | 9/2007 | Cofino et al. | |
| 7,278,105 B1 | 10/2007 | Kitts | |
| 7,830,813 B1 | 11/2010 | Lo et al. | |
| 7,890,451 B2 | 2/2011 | Cancel et al. | |

(Continued)

*Primary Examiner* — Mandrita Brahmachari
(74) *Attorney, Agent, or Firm* — Kowert, Hood, Munyon, Rankin & Goetzel, P.C.

(57) ABSTRACT

Systems and methods of visual mining of user behavior patterns are disclosed. A plurality of clickstreams may be received. Each clickstream may represent a corresponding sequence of user actions. A visual representation of each clickstream may be caused to be displayed on a device. Each visual representation may comprise a distinct graphical element for each user action of the corresponding clickstream, and each visual representation may be configured to indicate a frequency level of the corresponding clickstream. Each distinct graphical element may comprise a geometric shape and a corresponding color that distinctly represents the corresponding user action. Graphical elements of each visual representation may comprise a size that is proportional to the frequency level of the corresponding clickstream. An indication of a selection of one of the visual representations may be received, and additional information about the corresponding clickstream may be caused to be displayed on the device.

20 Claims, 13 Drawing Sheets

(56) References Cited

U.S. PATENT DOCUMENTS

| | | |
|---|---|---|
| 8,793,236 B2 | 7/2014 | Smith et al. |
| 2001/0032198 A1 | 10/2001 | Pao et al. |
| 2003/0023715 A1 | 1/2003 | Reiner et al. |
| 2008/0059444 A1 | 3/2008 | Singh et al. |
| 2008/0288306 A1 | 11/2008 | MacIntyre et al. |
| 2009/0273602 A1 | 11/2009 | Wong et al. |
| 2010/0070856 A1 | 3/2010 | Behl et al. |
| 2010/0169802 A1 | 7/2010 | Goldstein et al. |
| 2010/0332962 A1 | 12/2010 | Hammer et al. |
| 2011/0173264 A1 | 7/2011 | Kelly |
| 2014/0074758 A1 | 3/2014 | Amid et al. |

\* cited by examiner

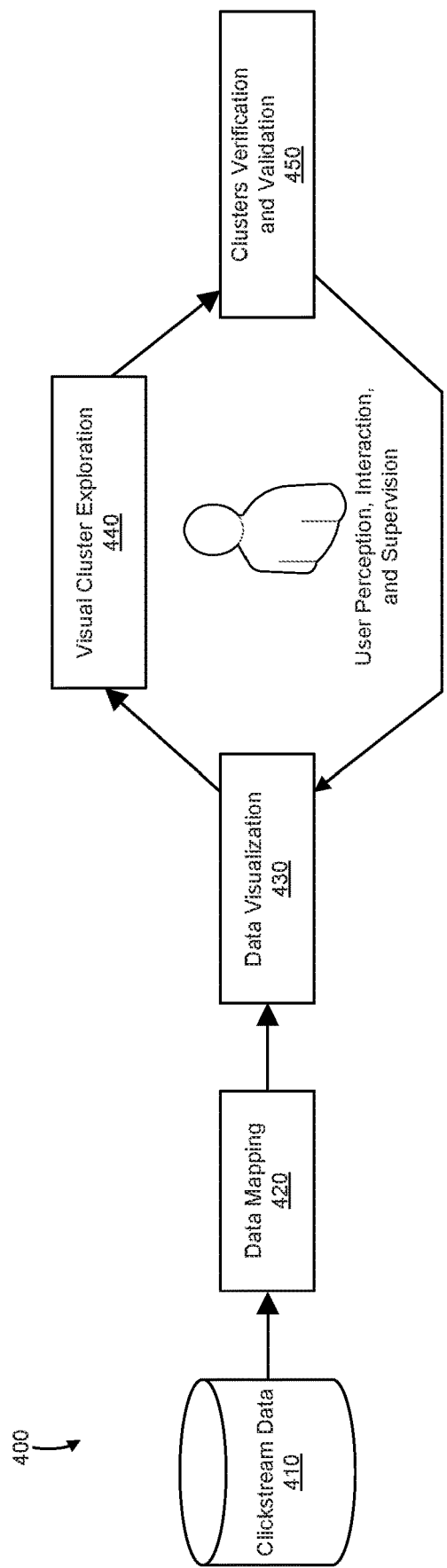

VISUAL MINING OF USER BEHAVIOR PATTERNS

CROSS-REFERENCE TO RELATED APPLICATIONS

This application is a continuation of U.S. application Ser. No. 16/051,471, filed Jul. 31, 2018 (now U.S. Pat. No. 10,606,437), which is a continuation of U.S. application Ser. No. 13/946,903, filed on Jul. 19, 2013 (now U.S. Pat. No. 10,037,121), which claims priority to U.S. Provisional Appl. No. 61/711,587, filed on Oct. 9, 2012; the disclosures of each of the above-referenced applications are incorporated by reference herein in their entireties.

TECHNICAL FIELD

The present application relates generally to the technical field of data processing and analysis, and, in various embodiments, to systems and methods of exploring various user behavior patterns reflected by clickstream information.

BACKGROUND

Web clickstream data are routinely collected to study how users browse the web or use a service. The ability to recognize and summarize user behavior patterns from such data is valuable to e-commerce companies. Clickstreams record user clicking actions on the web. Analyzing clickstream data provides insights into user behavior patterns, which are extremely valuable for e-commerce businesses. For example, knowing different user behavior patterns helps conduct market segmentations in order to develop marketing strategies, or enhance personalized shopping experience. In practice, however, learning the various user behavior patterns is nontrivial. Analysts often have little knowledge, but many questions, about what user behaviors are hidden in a clickstream dataset.

BRIEF DESCRIPTION OF THE DRAWINGS

Some embodiments of the present invention are illustrated by way of example and not limitation in the figures of the accompanying drawings, in which like reference numbers indicate similar elements and in which:

FIG. 3 illustrates a sample of clickstream data, in accordance with some embodiments;

FIG. 4 illustrates a process flow for visual cluster exploration, in accordance with some embodiments;

DETAILED DESCRIPTION

Figure 1:
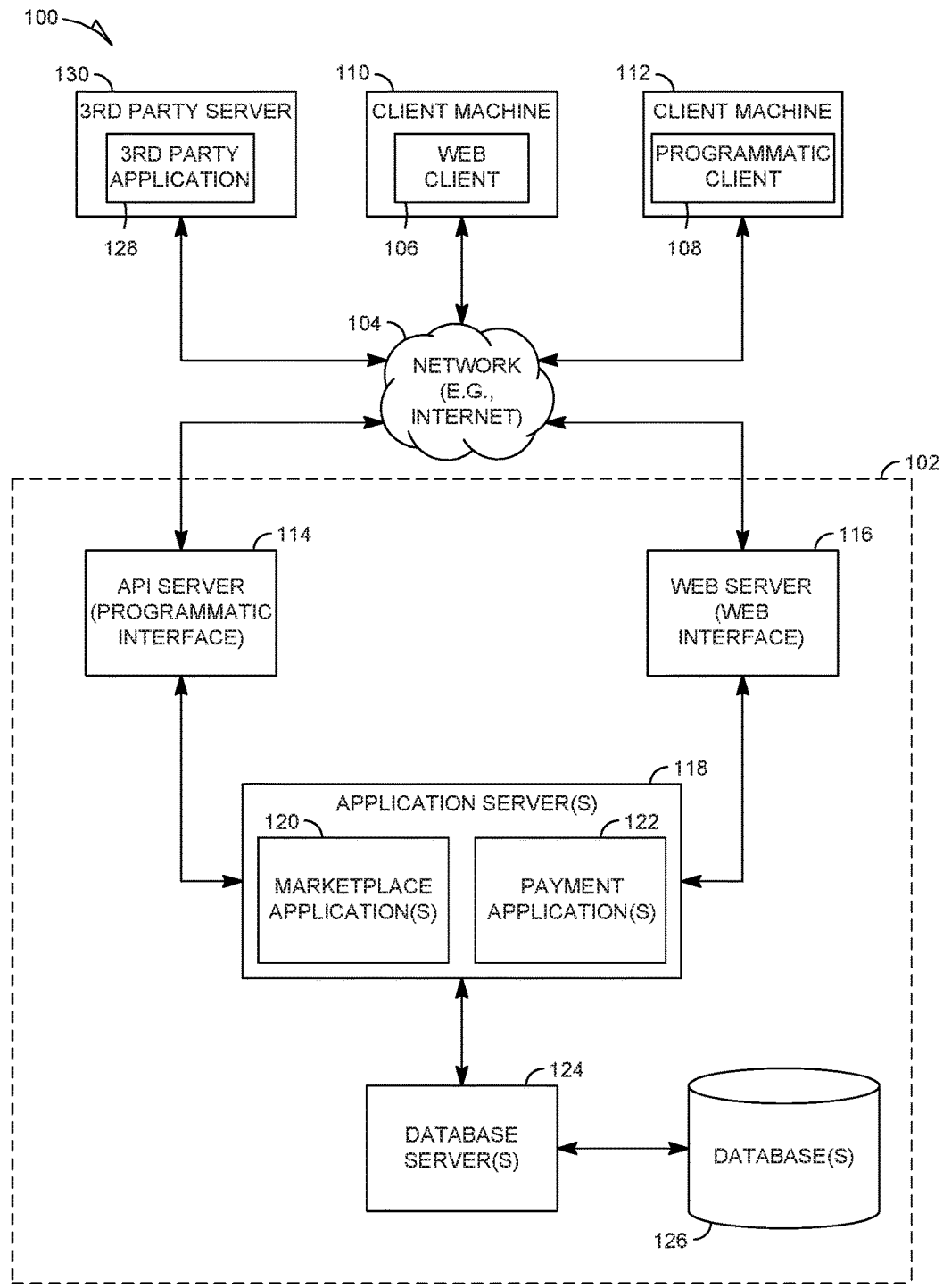
FIG. 1 is a block diagram depicting a network architecture of a system having a client-server architecture configured for exchanging data over a network, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In some embodiments, a system may comprise a machine and a data visualization module on the machine. The machine may have a memory and at least one processor. The data visualization module may be executable by the machine and be configured to receive a plurality of clickstreams. Each clickstream may represent a corresponding sequence of user actions. The data visualization module may be configured to cause a visual representation of each clickstream to be displayed on a device. Each visual representation may comprise a distinct graphical element for each user action of the corresponding clickstream, and each visual representation may be configured to indicate a frequency level of the corresponding clickstream.

In some embodiments, the data visualization module may be further configured to cause the visual representations to be displayed having relative positioning to one another, where the relative positioning between visual representations is based on a level of similarity between their corresponding clickstreams. For example, clickstreams may be visualized and placed on a 2D plane based on the similarities among them. Visual representations of similar clickstreams may be placed close to each other, while visual representations of dissimilar clickstreams may be placed far apart. As a result, users may be able to observe the different groups of behavior patterns in the visualization. The levels of similarity may be measured using Markov chain models, and the layout may be implemented using a Self-Organizing Map (SOM). Other ways of measuring levels of similarity and implementing the layout may also be used.

In some embodiments, each distinct graphical element may comprise a geometric shape and a corresponding color that distinctly represents the corresponding user action. In some embodiments, the geometric shape may be a rectangle. In some embodiments, graphical elements of each visual representation may comprise a size that is proportional to the frequency level of the corresponding clickstream.

In some embodiments, the system may further comprise a visual cluster exploration module that is executable by the machine. The visual cluster exploration module may be configured to enable, or otherwise allow, users to select a group of clickstreams (behavior patterns) and investigate additional information corresponding to them. In some embodiments, the visual cluster exploration module may be configured to receive an indication of a selection of one of the visual representations, and to cause additional information about the clickstream corresponding to the one of the visual representations to be displayed on the device. In some embodiments, the visual cluster exploration module may be configured to receive an indication of a selection of at least two of the visual representations, and to cause additional information about the clickstreams corresponding to the at least two of the visual representations to be displayed on the device. In some embodiments, the additional information comprises statistical information about the clickstreams. In some embodiments, the additional information may comprise demographic information.

In some embodiments, the system may further comprise a data mapping module, executable by the machine, configured to map clickstream data to a two-dimensional plane to form the plurality of clickstreams. In some embodiments, the data mapping module may be configured to apply an SOM with a probability model to the clickstream data. In some embodiments, the probability model may comprise a Markov chain.

In some embodiments, a computer-implemented method may comprise receiving a plurality of clickstreams. Each clickstream may represent a corresponding sequence of user actions. A machine having a memory and at least one processor may cause a visual representation of each clickstream to be displayed on a device. Each visual representation may comprise a distinct graphical element for each user action of the corresponding clickstream, and each visual representation may be configured to indicate a frequency level of the corresponding clickstream.

In some embodiments, the visual representations may be caused to be displayed having relative positioning to one another, where the relative positioning between visual representations is based on a level of similarity between their corresponding clickstreams. For example, clickstreams may be visualized and placed on a 2D plane based on the similarities among them. Visual representations of similar clickstreams may be placed close to each other, while visual representations of dissimilar clickstreams may be placed far apart. As a result, users may be able to observe the different groups of behavior patterns in the visualization. The levels of similarity may be measured using Markov chain models, and the layout may be implemented using SOM. Other ways of measuring levels of similarity and implementing the layout may also be used.

In some embodiments, each distinct graphical element may comprise a geometric shape and a corresponding color that distinctly represents the corresponding user action. In some embodiments, the geometric shape may be a rectangle. In some embodiments, graphical elements of each visual representation may comprise a size that is proportional to the frequency level of the corresponding clickstream.

In some embodiments, the method may further comprise receiving an indication of a selection of one of the visual representations, and causing additional information about the clickstream corresponding to the one of the visual representations to be displayed on the device. In some embodiments, the method may further comprise receiving an indication of a selection of at least two of the visual representations, and causing additional information about the clickstreams corresponding to the at least two of the visual representations to be displayed on the device. In some embodiments, the additional information comprises statistical information about the clickstreams.

In some embodiments, the method may further comprise mapping clickstream data to a two-dimensional plane to form the plurality of clickstreams. In some embodiments, mapping the clickstream data to a two-dimensional plane may comprise applying an SOM with a probability model to the clickstream data. In some embodiments, the probability model may comprise a Markov chain.

In some embodiments, a non-transitory machine-readable storage device may store a set of instructions that, when executed by at least one processor, causes the at least one processor to perform the operations and method steps discussed within the present disclosure.

Networked System

FIG. 1 is a network diagram depicting a client-server system 100, within which example embodiments of the systems, modules, and methods of the present disclosure may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
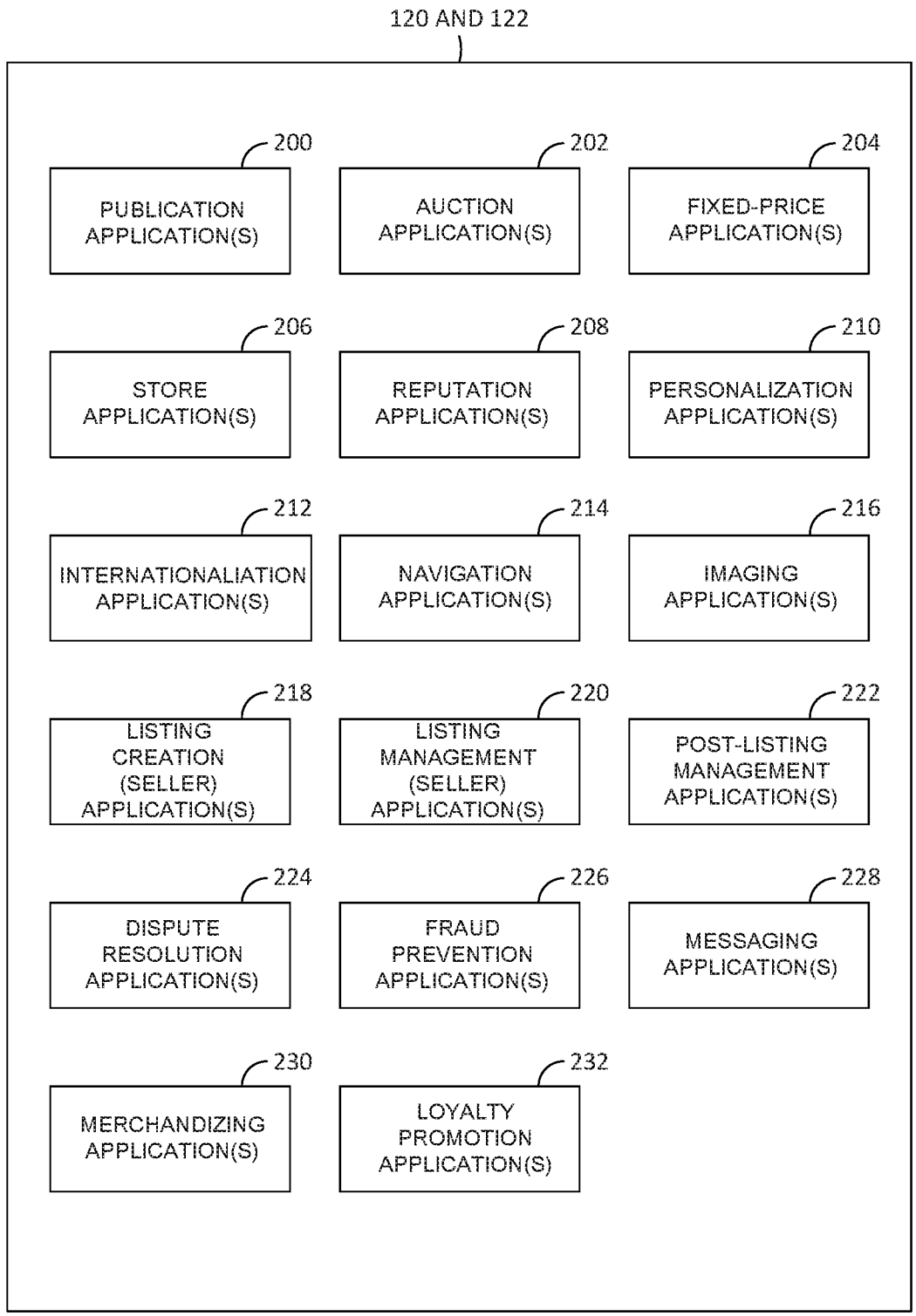
FIG. 2 is a block diagram depicting a various components of a network-based publisher, in accordance with some embodiments.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings, available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Visual Analytics System

A visual analytics system configured to explore the various user behavior patterns reflected by distinct clickstream clusters is disclosed herein. In a practical analysis scenario, the system may first present an overview of clickstream clusters using a Self-Organizing Map (SOM) with Markov chain models. Then the analyst can interactively explore the clusters through an intuitive user interface. The analyst can either obtain summarization of a selected group of data or further refine the clustering result. Analysts frequently ask the following questions:

What are the most frequent user behavior patterns?

What are the demographics of the users who follow a specific behavior pattern?

How do the behavior patterns correlate with the performance of the online service? The interactive data exploration environment of the present disclosure provides a fairly effective way of finding answers to these questions. A visual analytics system is provided to support such an answer-seeking process. This visual analytics system enables analysts to inspect different user behavior patterns and examine the associated pattern profiles.

Nevertheless, clickstream data have a number of characteristics that make the visual analysis task challenging. For example, clickstreams are inherently heterogeneous, and uncertainty naturally arises during automatic clustering, which makes it indeterminate to partition the data. In addition, it is difficult to visually summarize a cluster of clickstreams and to visually present group behavior.

In order to handle these challenges, a derived SOM may be utilized to map and cluster the clickstreams. An enlightening visualization, or visual representation, may be designed, from which analysts can see the clear cluster structure. Intuitive interaction tools may be provided to enable detailed data examination and cluster structure refinement. Some features of this disclosure include, but are not limited to:

An SOM with Markov chain models may be derived to map clickstreams to a 2D space.

A 2D layout algorithm may be used to reduce visual clutter.

An interactive cluster exploration process may be used to enable user-guided clustering.

These features, as well as other features disclosed herein, are helpful in discovering user behavior patterns and corresponding demographic information.

Data and Approach Overview

A clickstream is an ordered sequence of predefined actions. For example, consider a seller listing items for sale on eBay. This seller may need to complete the Sell-Your-Item page. The page may request extensive selling related information, which can be categorized into eight sections: Category: select a category where the item will appear; Title: write a title for the item; Picture: select or upload pictures of the item; Description: describe the item; Pricing: set a price for the item; Payment: set the payment options; Shipping: choose shipping methods and set the shipping cost; OtherOptions: set other information about the listing, such as tax and return policy.

The clickstream data from the Sell-Your-Item page may capture user actions in terms of the sections the seller edits. FIG. 3 shows a sample of clickstream data 300 on the Sell-Your-Item page of the eBay website, in accordance with some embodiments. In this example, there are eight predefined actions based on the eight sections on the page, including: Category, Title, Picture, Description, Pricing, Payment, Shipping and Other Options. Each row 310 may represent one clickstream. Clickstreams are sequences of user actions, which are of various lengths.

A compact and intuitive visualization of the clickstreams may be achieved using the techniques and methodologies disclosed herein. Each click action may be encoded as a geometric shape, such as a rectangle. It is contemplated that other geometric shapes may also be used. Each click action may also be colored differently. Thus, in some embodiments, one clickstream may be represented by a sequence of colored rectangles (or other geometric shapes).

Figure 5:
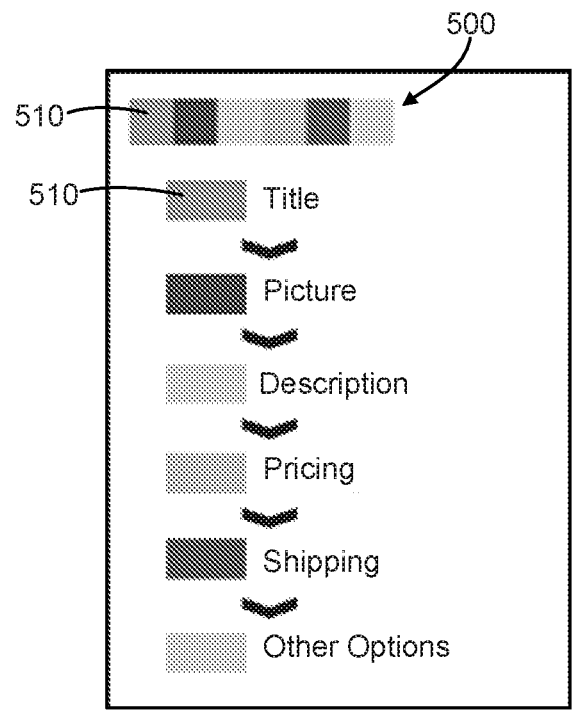
FIG. 5 illustrates a visualization of an example clickstream, in accordance with some embodiments.

FIG. 5 illustrates a visualization, or visual representation, 500 of an example clickstream, in accordance with some embodiments. In some embodiments, the visualization 500 may comprise a sequence of colored rectangles 510. Other geometric shapes are also within the scope of the present disclosure. Each click action in the clickstream may comprise a different color. For example, a click action for the Title section may have its own distinct color, a click action for the Picture section may have its own distinct color, a click action for the Description section may have its own distinct color, a click action for the Pricing section may have its own distinct color, a click action for the Shipping section may have its own distinct color, and a click action for the Other Options section may have its own distinct color, as shown in FIG. 5.

In order to help users identify the most frequent behavior patterns, the size of a rectangle 510 may be proportional to the frequency of the clickstream pattern's existence in the data set. This visualization 500 may be used to see that users edited the sections in different ordering, skipped some sections, and revisited some sections in the same clickstream. User demographics and other selling related information may be collected as well for understanding their correlations with user behaviors.

FIG. 4 illustrates a process flow 400 for visual cluster exploration, in accordance with some embodiments. First, at 410, clickstream data may be received. This clickstream data may be obtained from one or more databases. At 420, the received clickstreams may be mapped to a 2D plane. The topological relations among the data may be preserved. At 430, the clickstreams may be visually encoded to achieve data visualization. Their placement may be adjusted to reduce visual clutter. This 2D visualization can make it possible to both observe an overview of the cluster structure and perceive individual clickstream patterns. At 440, visual cluster exploration may be performed. Here, analysts may interpret the visual representation, interact with data to obtain detailed information, and select representative clickstreams as cluster prototypes. Analysts may also label or name the selected clusters and their corresponding detailed information, and store them in one or more databases. The labels or names may be used to organize and search for the clusters and their corresponding detailed information. At 450, the selected groups can be shown with statistical summarization and/or used to refine the clustering result. Users can iterate between the third and fourth steps until a satisfactory result is achieved. The steps of the process flow 400 will be discussed in further detail below.

Data Mapping and Clustering

Practically speaking, it is intuitive for people to perceive and interact with data in a lower dimensional space. Therefore, mapping the clickstreams on a 2D plane may be employed to facilitate data perception. Additionally, data may be partitioned into clusters so as to reveal different behavior patterns. The SOM may be used to achieve this goal. However, the conventional SOM is designed to handle data of the same dimensionality, which are quite different from clickstreams of different lengths. In order to solve this problem, probabilistic models may be utilized within the SOM framework to accommodate the clickstream data mapping and clustering. In this section, we will first give a brief introduction to SOM, and then elaborate on how probabilistic models are integrated into the SOM framework.

The SOM is a neural network model for high-dimensional data mapping and clustering. It consists of components called nodes or neurons which are usually arranged on a regular 2D grid. One node is associated with a vector prototype representing a cluster of input data, and nearby nodes contain similar vector prototypes. A trained SOM can map high-dimensional data into a 2D space while maintaining topological relations among data objects.

The SOM may be trained by the competitive learning method, which iteratively updates the vector prototypes. For instance, a batch algorithm may train SOM iteratively by applying the following two steps, Matching: for each prototype m, collect a list of clickstreams, whose best matching (most similar) prototype is within the neighborhood of m;

Adjusting: adjust the prototypes using their respective collections of matching clickstreams.

During the training process, the neighborhood size decreases at each iteration. The neighborhood relation h(i, j) between two prototypes i and j are determined by the geometric relations of their corresponding grid points $o_i$ ($x_i$, $y_i$) and $o_j$ ($x_j$, $y_j$). The commonly used neighborhood relation is the Gaussian function, i.e., $$h(i, j) = \frac{1}{\sqrt{2\pi} \delta} \exp\left(-\frac{\|o_i - o_j\|^2}{2 \times \delta^2}\right) \quad (1)$$

After the SOM training, a set of vector prototypes may obtained representing the input data, with similar prototypes staying closer. The input data may also be projected into a low-dimensional space, e.g., a 2D regular grid.

Regarding the conventional SOM, the vector prototypes may have the same dimensionality as input data. At the matching step, the similarity between an input data item and a prototype may be measured by a pre-defined similarity metric, such as Euclidean distance. At the adjusting step, the prototypes may simply be updated by taking the mean value over their respective lists of matching data items. However, since the clickstream data are heterogeneous and of different lengths, it is not trivial to design a feasible similarity metric and to use specific vectors to represent clickstreams. In order to deal with this issue, probability models may be used as prototypes to describe the clickstreams. The "similarity" between a clickstream and a probability model may be measured by the probability at which the clickstream fits in the model. As such, SOM with probability models can be applied to map the clickstream data onto a 2D plane.

In some embodiments, a first-order Markov chain is used to describe clickstreams, since the Markov chain is a simple but efficient model to describe user behaviors. Other models can also be adapted in the SOM framework, provided that the model can capture the data characteristics well. Regarding clickstreams, the set of M predefined actions, $A=\{a_1, \ldots, a_m, \ldots, a_M\}$, corresponds to the set of states of the Markov chain model. A dataset of N clickstreams may be defined as U, where $U=\{u_1, \ldots, u_n, \ldots, u_N\}$. A clickstream $u_n$ may be an ordered sequence with $l_n$ actions: $(u_{n,1}, \ldots u_{n,i}, \ldots, u_{n,l_n})$, where $u_{n,i} \in A$. The set of K Markov chain models across the SOM grid points may be represented as $\Theta=\{\theta_1, \ldots, \theta_k, \ldots, \theta_K\}$. A Markov chain model may be determined by its parameters, $\theta_k=\{\theta_k^1(u_{n,1}=a_m), \theta_k^T(u_{n,i}=a_s|u_{n-1}=a_m)\}$, where $\theta_k^1(u_{n,1}=a_m)$ denotes the probability of a clickstream starting with an action $a_m$ and $\theta_k^T(u_{n,i}=a_s|u_{n,i-1}=a_m)$ denotes the transition probability of two consecutive actions $a_m$ and $a_s$.

At each SOM training iteration, rather than simply finding the best matching data points and calculating a mean vector, the Expectation-Maximization (EM) algorithm may be applied to recover the optimal parameters of SOM with Markov chain models. Algorithm 1 below gives an overview of the competitive learning algorithm for training SOM with Markov chain models:

---
Algorithm 1 Competitive Learning Algorithm for
Training SOM with Markov Chains
---
Input: a clickstream dataset U; the number of SOM grid points K; a minimum neighborhood size $\delta_{min}$ and a decreasing factor $\delta_r$.
1: while the neighborhood size is bigger than $\delta_{min}$ do
2:    Decrease the neighborhood size by $\delta_r$;
3:    // EM Algorithm
4:    while the likelihood calculated by function 2 increases do
5:    E-Step: calculate the expectation value using function 5, update the probabilities according to functions 4 and 3;
6:    M-Step: update Markov chain model parameters using functions 6 and 7;
7:    end while
8: end while
---

Specifically speaking, at each iteration of the SOM training, the EM algorithm may search the domain of model parameters and update $\Theta$ in order to maximize the coupling likelihood $L_c(\Theta|U)$, which measures how well the models fit the dataset.

$$\mathcal{L}_c(\Theta|U) = \sum_{n=1}^{N} \log \sum_{k=1}^{K} \frac{1}{K} p_c(u_n|\theta_k) \quad (2)$$

$p_c(u_n|\theta_k d)$ represents the coupling likelihood between a clickstream $u_n$ and a model $\theta_k$. It is defined as the joint probability of $u_n$ fitting in $\theta_k$ and models in its neighborhood, which is defined by $h(k, r)$.

$$p_c(u_n|\theta_k) = p(u_n|\theta_k) \prod_{r \neq k} p(u_n|\theta_r)^{h(k,r)} \quad (3)$$

where $p(u_n|\theta k)$ represents the probability of one clickstream $u_n$ fitting in a Markov model $\theta_k$, i.e., $$p(u_n|\theta_k) = \theta_k^I(u_{n,1}) \prod_{i=2}^{l_n} \theta_k^T(u_{n,i}|u_{n,i-1}) \quad (4)$$

Once the objective likelihood function is defined, the EM algorithm may iterate between two key steps, E-step and M-step, to find the optimal Markov chain parameters. Embodiments of these steps are described below.

E-step: Calculate the posterior probability $p_c(u_n|\theta_k^{old})$ that gives the probability of the n-th data object fitting in the model k with parameters $\theta_k^{old}$ calculated in the last iteration. The posterior expectation of $L_c$, the so-called Q-function, may be calculated as follows, $$Q(\Theta; \Theta^{old}) = \sum_{l=1}^{K} \sum_{n=1}^{K} \sum_{k=1}^{K} p_c(u_n|\Theta_k^{old})h(k,l)\log p(u_n|\theta_l) \quad (5)$$

M-step: Maximize the Q-function with respect to each subset of parameters Q. The update rules for each set of parameters are shown below, and it guarantees to increase the coupling likelihood $L_c$:

Initial state probability, $$\theta_k^I(u_{n,1} = a_m) = \frac{\sum_{n=1}^{N} \sum_{l=1}^{K} p_c(u_n|\theta_k^{old})h(k,l)\delta(u_{n,1}, a_m)}{\sum_{r=1}^{M} \left[\sum_{n=1}^{N} \sum_{l=1}^{K} p_c(u_n|\theta_k^{old})h(k,l)\delta(u_{n,1}, a_r)\right]} \quad (6)$$

where $\delta(u_{n,1}, a_m)$ is an indicator function that is equal to 1 if $u_{n,1}=a_m$ and 0 otherwise. Transition probability, $$\theta_k^T(u_{n,i} = a_s | u_{n,i-1} = a_m) = \quad (7)$$

$$\frac{\sum_{n=1}^{N} \sum_{l=1}^{K} p_c(u_n|\theta_k^{old})h(k,l)\beta(u_{n,i} = a_s | u_{n,i-1} = a_m)}{\sum_{r=1}^{M} \left[\sum_{n=1}^{N} \sum_{l=1}^{K} p_c(u_n|\theta_k^{old})h(k,l)\beta(u_{n,i} = a_r | u_{n,i-1} = a_m)\right]}$$

Where $\beta(u_{n,i}=a_r|u_{n,i-1}=a_m)$ is an indicator function that equals to 1 if action $a_r$ follows right after action $a_m$ in the clickstream $u_n$ and 0 otherwise.

After the SOM with a set of Markov chain models is trained, each clickstream may then be mapped to a 2D position $p_n$ determined by the coordinates of a model, $o_k(x_k, y_k)$ and the probabilities $p(u_n|\theta_k)$ of that clickstream fitting into the respective models, $$p_n = \sum_{k=1}^{K} o_k p(u_n|\theta_k) \quad (8)$$

In other words, a clickstream may be placed close to the models that it fits better.

Visualization

Although the clickstreams may be successfully projected onto a 2D space after the data mapping step, creating a visualization that can clearly present the clickstream clusters can still be an issue. This problem may be addressed by introducing a self-illustrative visual representation of clickstreams and an effective layout algorithm.

As previously discussed, clickstreams are sequences of user actions, which may be of various lengths. Each click action may be encoded as a geometric shape, such as a rectangle, and be colored differently from the other click actions. Thus, one clickstream may be represented by a sequence of colored rectangles, or other geometric shapes. Take an example using the previously discussed Sell-Your-Item page, where a seller lists an item for sale on eBay and carries out a series of actions: (1) edit title; (2) upload pictures; (3) write description; (4) set prices; (5) select shipping methods; and (6) set other options. An example embodiment of the corresponding visualization 500 is shown in FIG. 5. In order to help users identify the most frequent behavior patterns, the size of a rectangle may be proportional to the frequency of the clickstream pattern's existence in the data set.

Figure 7A:
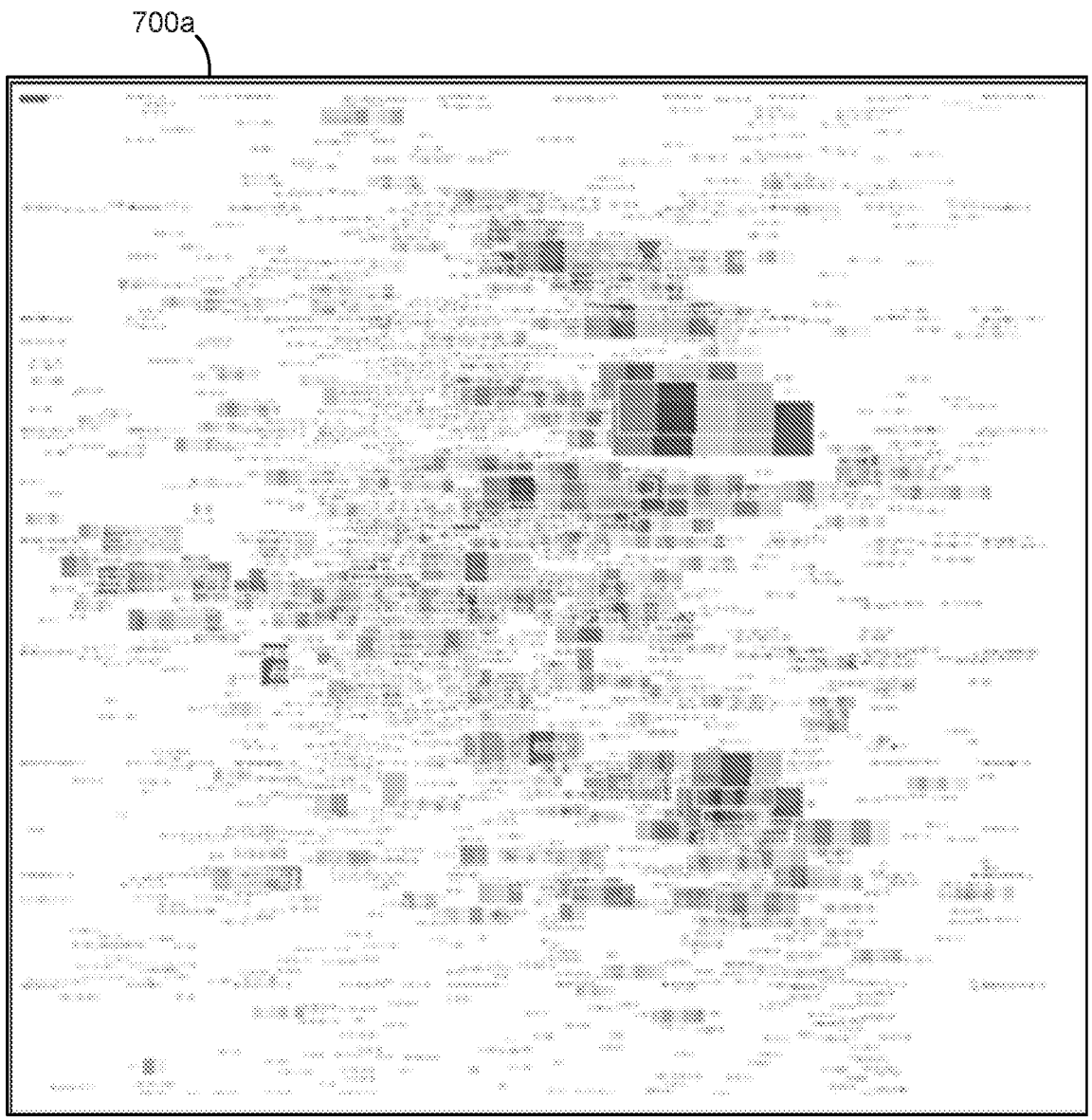
FIG. 7A illustrates a visualization of clickstreams by placing them where they are mapped on a 2-dimensional (2D) plane, in accordance with some embodiments.

Considering that visual metaphors take up space unlike mapped data points, it can cause a serious overlapping problem if visual rectangles of all clickstreams are naively placed where they are mapped. FIG. 7A illustrates a visualization 700a of clickstreams by placing them where they are mapped on a 2-dimensional (2D) plane, in accordance with some embodiments. Although we can see the cluster structure in the visualization 700a, it is impossible to tell the representative behavior patterns of each cluster because of the overlapping of elements. Thus, the layout should be adjusted to reduce visual clutter. In addition, it is unscalable and unnecessary to display all clickstreams on a limited screen, especially when the data size is large. A proper placement strategy of the present disclosure may satisfy the following principles:

Uncluttered—the clutter ought to be at a low level which doesn't affect visual pattern perception.

Consistent—the topological relations among the mapped clickstreams should be preserved.

Representative—important clickstream patterns should be guaranteed to be presented.

The present disclosure fully considers the above three principles during the placement strategy design. First, in some embodiments, clickstreams may be moved to avoid overlapping as much as possible. Second, in some embodiments, regarding the consistency principle, when moving a clickstream, the placement may be constrained in its surrounding area. Lastly, in some embodiments, a significance factor may be employed to measure the representativeness of each clickstream. For important clickstreams, they may be guaranteed to have higher priorities so that they are placed first. The significance factor of each clickstream $u_n$ contributing to a model k may be defined as:

$$s_{n,k} = f_n(u_n|\theta_k) \tag{9}$$

where $f_n$ represents the frequency of a clickstream pattern $u_n$'s existence, and $p(u_n|\theta_k)$ is the probability of $u_n$ fitting in model k. The associated significance of one clickstream may be defined as:

$$s_n = \max s_{n,k} k \tag{10}$$

The layout algorithm may be illustrated in Algorithm 2 below.

---

Algorithm 2 Layout Generation by Randomized Greedy Algorithm

Input: clickstream rectangles V = {$v_1$, . . . ,$v_N$}, the corresponding mapped positions
P = {$p_1$, . . . ,$p_N$}, the associated significance measure S = {$s_1$, . . . , $s_N$}, and the flag signs F = {$f_1$, . . . ,$f_N$} to indicate whether a clickstream is representative.
1: Sort rectangles according to S, and move the ordered representative clickstreams to the beginning of the list;
2: for each rectangle $v_n$ in the sorted list do
3:    while $v_n$ doesn't reach the outer end of the spiral do
4:        Move $v_n$ a bit along the spiral path and try to place it;
5:        if $v_n$ doesn't intersect with other placed rectangles then
6:            Place $v_n$;
7:            break;
8:        end if
9:    end while
10:    if $v_n$ is representative, but didn't find a placement then
11:        Place $v_n$ at $p_n$;
12:    end if
13: end for

---

Figure 6:
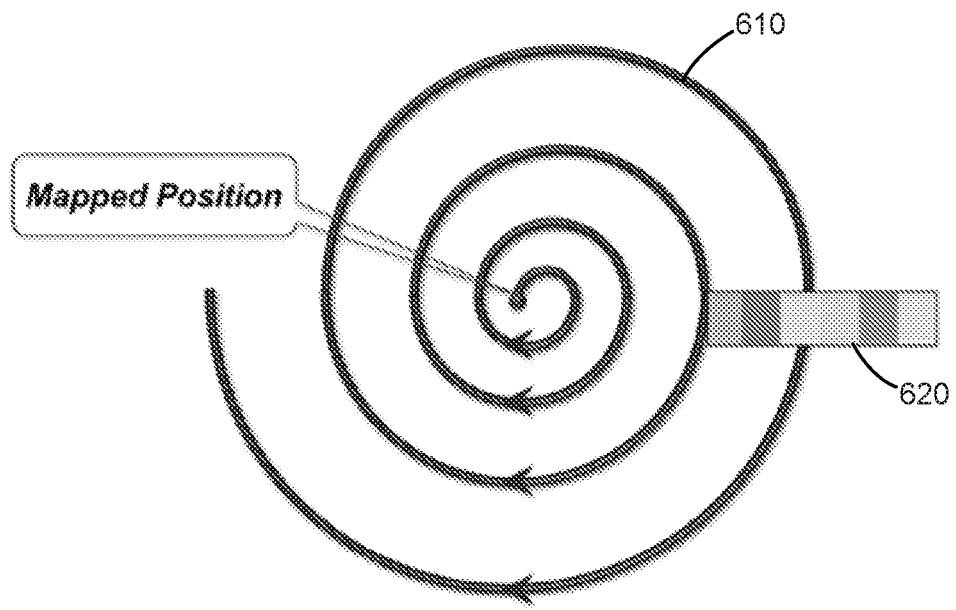
FIG. 6 illustrates a spiral path along which each clickstream is looking for a position to stay without overlap, in accordance with some embodiments.

All clickstreams may first be sorted in a descending order according to their maximum significance values across all models. Then, a randomized greedy algorithm may be applied to place the clickstream rectangles. Every clickstream rectangle is trying to be placed along a spiral path starting at the clickstream's mapped position, as shown in FIG. 6. FIG. 6 illustrates a spiral path 610 along which each clickstream 620 is looking for a position to stay without overlap, in accordance with some embodiments. The starting point is in the center and the clickstream rectangle marches to the outer end. After a limited number of trials, the rectangle may be either placed or discarded finally. However, a set of clickstreams that best fit each model based on the significance values may be selected as representative clickstreams. They may be guaranteed to be placed even if overlapping cannot be avoided. A Boolean sign b may be used to indicate whether one clickstream is representative, B={$b_i$, . . . , $b_N$}, for all clickstreams. A little clutter would not prohibit the patterns perception because human eyes as "low-pass" filters. When similar data objects are grouped and form a significant pattern to attract users' attention, they can discover the clustered patterns and ignore high-frequency "noise".

This layout generation approach is straightforward, and the final visualization shows distinct patterns with little clutter. Additionally, we may evaluate the completeness of placement of significant clickstreams by the factor:

$$CoS = \frac{\Sigma \text{ significance of the placed clickstream}}{\Sigma \text{ significance of all clickstream}}.$$

Figure 7B:
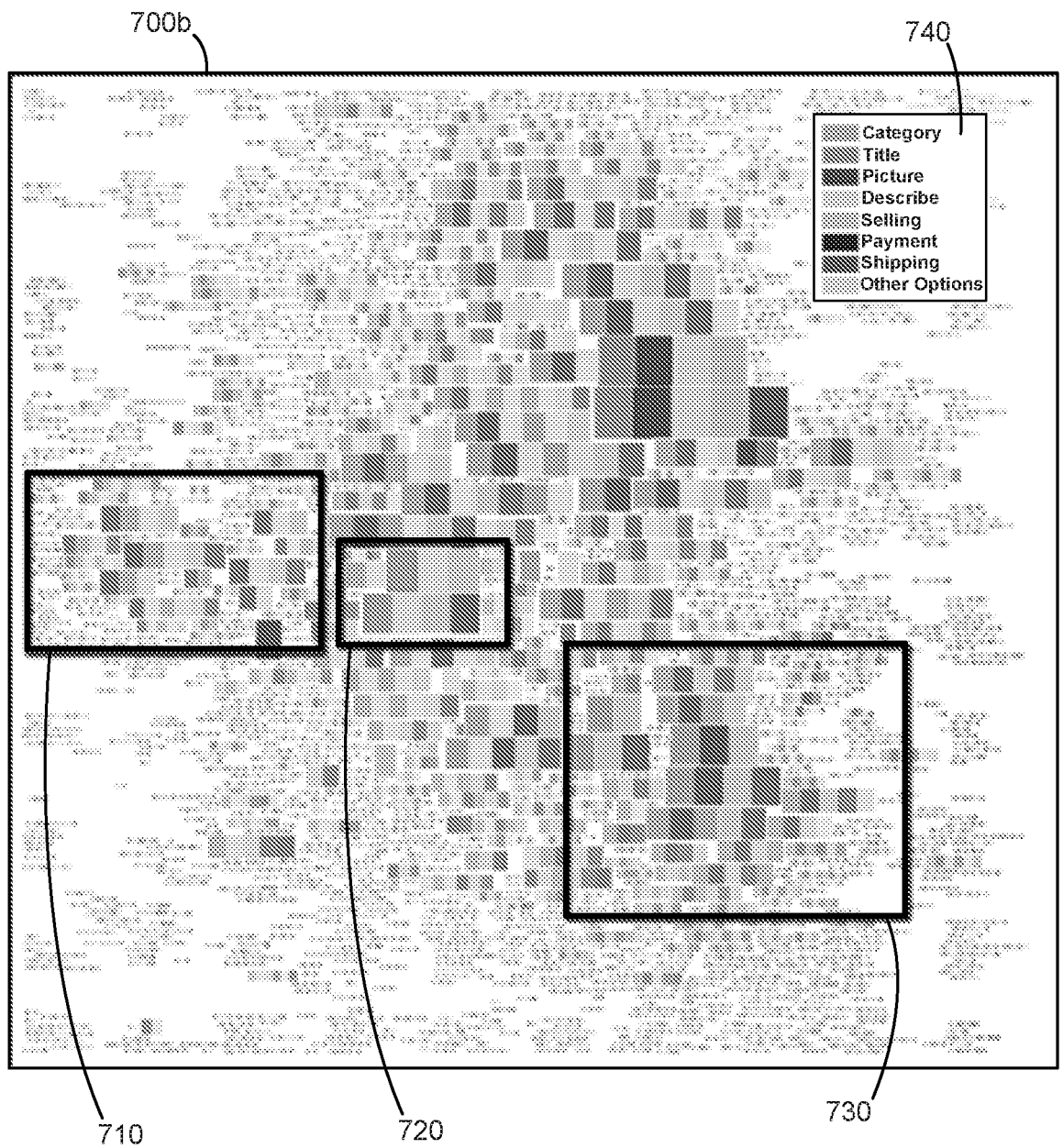
FIG. 7B illustrates a visualization of clickstreams after the data has been sorted according to significance measure and then placed by searching along the spiral path, in accordance with some embodiments.

FIGS. 7A and 7B show the comparison between the visualizations 700a and 700b, respectively, before and after the placement method of the present disclosure is applied to the Sell-Your-Item dataset. FIG. 7A presents the visualization 700a of clickstreams by placing them where they are mapped on the 2D plane. FIG. 7B presents the visualization 700b of clickstreams after the data has been sorted according to significance measure and then placed by searching along the spiral path, in accordance with some embodiments. A box 740 of legends of click actions may be presented to help the user identify to what click action each colored geometric shape corresponds. In FIG. 7B, the CoS value is 93.2%, which means the majority of the clickstream patterns are displayed. Generally speaking, it is intuitive for people to perceive and interact with data in a lower dimensional space. Therefore, the 2D visualization 700b shown in FIG. 7B may be provided for visual cluster exploration. As previously described, each rectangular block denotes a clickstream pattern. In order to preserve the cluster structures, the layout may preserve data topological relations in the original data. The SOM integrated with first-order Markov chains may be used for mapping the data to points in the 2D plane. Then, a clever layout method may be implemented to reduce the visual cluster caused by overlapping. The layout method may favor toward the representative patterns.

Interactive Exploration

Interaction is the key to exploratory data analysis. It provides the opportunity for people to communicate with data. The system of the present disclosure may enable the examination of details about one clickstream or any chosen group of clickstreams. Based on the visualization, analysts may want to divide the whole clickstream dataset into a number of clusters based on their perception. The system of the present disclosure may support interactive cluster analysis under the analysts' supervision.

Figure 8:
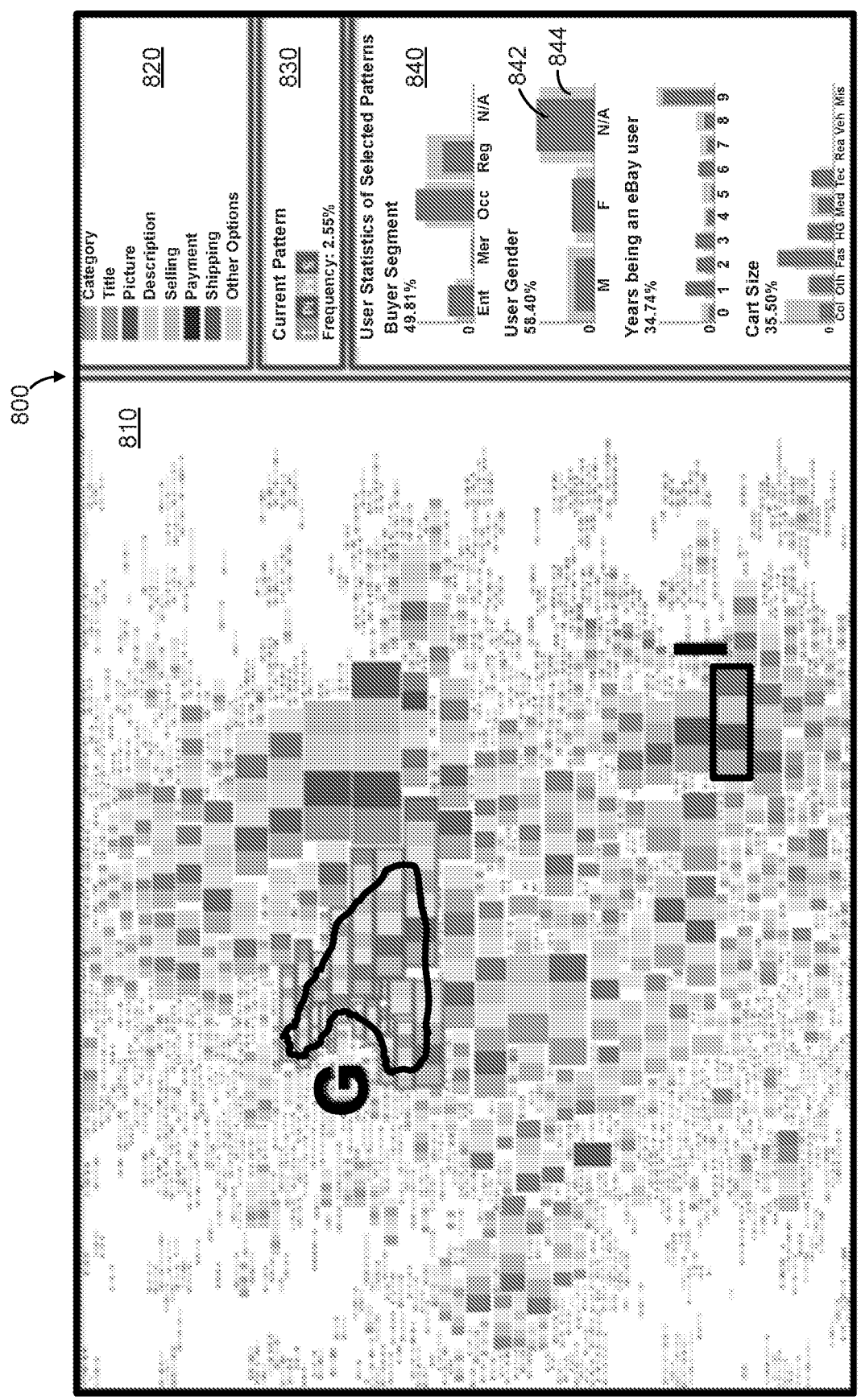
FIG. 8 illustrates an interface for clickstream pattern exploration, in accordance with some embodiments.

Visualization is a way of communicating messages from data. Analysts observe, interpret and make sense of what they see to understand the clickstreams. FIG. 8 illustrates an interface 800 for clickstream data visualization and exploration, in accordance with some embodiments. The clickstreams may be visualized on the left side 810, with the legends of actions displayed at the upper-right corner area 820. The analyst can move a mouse, or other user selection mechanism, over an interesting clickstream pattern to check the corresponding data profile. For example, the clickstream "I" highlighted in bold in FIG. 8 may be an interesting clickstream. Area 830 may show the visual pattern of clickstream "I" and the existence frequency of this clickstream pattern in the dataset. The lower-right corner area 840 may present the demographic information and statistical summary about the corresponding clickstream pattern by using histograms. The dark histograms 842 may indicate the statistical distribution of each data attribute for the specific clickstream pattern, while the background light histograms 844 may show the overall distribution of the entire dataset.

The analyst can also freely select a group of clickstreams, such as the group "G" highlighted in bold in FIG. 8, to check the group statistical information. Whenever the analyst selects a single clickstream (e.g., indicated as "I") or a group (e.g., indicated as "G"), the corresponding information summary may be shown in area 820. This intuitive exploration approach assists analysts to learn about data details from multiple aspects and at different scales.

Although SOM may project clickstreams onto the 2D plane with similar data staying together, deciding which clickstreams belong to the same group still may depend on domain knowledge. Since the displayed clickstreams are only representative samples, cluster analysis of the whole dataset may be supported in order to obtain a thorough statistical summary. In some embodiments, an interactive cluster analysis approach, the semi-supervised K-means, may be used to meet this need. The analyst can specify distinct groups of clickstreams on the visualization and then cluster the whole dataset using the specified groups. During the process of cluster analysis, the clickstreams may be represented by their 2D mapped coordinates. Since the original inter-clickstream topological relations are preserved while data mapping, it is reasonable to use the 2D coordinates to cluster clickstreams.

People can easily perceive and verify clickstream patterns by using the visualization and interaction tools disclosed herein. An interactive cluster analysis method may be introduced by combining the automatic K-means algorithm and experts' domain knowledge through interactive visualization. The analyst's input may be utilized as initialization and constraints in the K-means algorithm. Considering K-means has one drawback that it is only feasible for searching hyperspherical-shaped clusters, a centroid chain technique may be adopted to deal with this problem. In some embodiments, each cluster may be represented by a centroid chain instead of a centroid as in the standard K-means algorithm.

When the analyst starts the interactive cluster analysis, he or she may sketch loops to include clickstreams. All clickstreams in one loop may belong to a group. The clickstreams lying on the loop may be connected as a centroid chain. After the interaction, the semi-supervised K-means algorithm may initialize the number of clusters as K, the number of clickstream groups, and extract the centroid chain from each group to represent the cluster. Then, the algorithm may proceed by alternating between two steps, the assignment step and the updating step, until the within-cluster sum of squares (WCSS) is minimized. The WCSS may be defined as:

$$WCSS = \sum_{k=1}^{K} \sum_{p_n \in S_k} Dist(p_n, C_k) \quad (11)$$

where $S_k$ corresponds to the cluster set K and $p_n$ is a data sample within $S_k$, $C_k$ is the centroid chain of cluster K with $C_k = \{p_1, \ldots, p_m, \ldots, p_M\}$. The distance $Dist(p_n, C_k)$ between a data point and a centroid chain may be defined as:

$$Dist(p_n, C_k) = \min_{p_m \in C_k} \|p_n - p_m\| \quad (12)$$

In each iteration of the K-means algorithm, at the assignment step, the selected clickstreams by the analyst may be assigned to the specified group, and the unselected data may be assigned to its closest cluster. Meanwhile, each centroid $p_m$ along the centroid chain may record a collection of data points that are most close to it. At the updating step, the centroid chain of each cluster may be updated by taking the mean over $p_m$ and its associated collection of close points recorded at the assignment step. Details of one embodiment of a semi-supervised K-means algorithm are shown in Algorithm 3 below. The final clustering results are not only presented in the visualization immediately, but can also be exported to files for further analysis. The clusters and their results (e.g., the additional information) may be labeled or named by the user and stored in one or more databases (e.g. database(s) 126 in FIG. 1 or database(s) 1210 in FIG. 12). The labels or names may be used to organize and search for the clusters and their results.

---

Algorithm 3 Semi-supervised K-means Using Centroid Chains

---

Input: A set of labeled clickstreams by the analyst and unlabeled ones.
    K groups of centroid chains $C = \bigcup_{k=1}^{K} C_k$.
1: Initialize the cluster number as K, and $C_k$ as the centroid chain
    of the cluster k;
2: while WCSS is reducing do
3:    // Clickstreams assignment
4:    for each clickstream $p_n$ do
5:        if $p_n$ was labeled then
6:            Assign $p_n$ to the user specified cluster;
7:        else
8:            Assign $p_n$ to the cluster that has $p_n$'s closest centroid
                chain using the distance measure as Equation
                12, record the closest clickstreams to each centroid
                chain nodes;
9:        end if
10:    end for
11:    // Centroid chains updating
12:    Update centroid chains by taking the mean over each centroid
        chain node and its corresponding closest clickstreams;
13:    Calculate within-cluster sum of squares (WCSS);
14: end while

---

EXAMPLES

Understanding how people use a website is critical to the success of an e-commerce business. Analysts and product managers often have difficulties in obtaining insights into user behavior patterns from the clickstream data. The system of the present disclosure can be used to explore data in their domains, and give feedback. The following are examples of how the system may be used. It is contemplated that other embodiments are within the scope of the present disclosure.

In some embodiments for the eBay marketplace, listing items for sale may be the beginning of all seller activities.

Thus, making the listing process intuitive and efficient is important. As previously described, sellers may be required to fill out eight sections on the Sell-Your-Item page. The layout and ordering of these sections may be critical to the website usability. The sections may be laid out in a sequential order from top down, which may be designed and evaluated by user experience designers based on user studies conducted in usability labs. These user experience designers may want to understand how users interact with the page in real-world scenarios, and may seek answers to the following questions:

Do users fill in all the information requested on the page?
Do they follow the pre-defined order to fill in information?
What are the scenarios when the answers to the questions above are "No"?

In some embodiments of preparing the data, data may be sampled from one day clickstream data on the Sell-Your-Item page of eBay's United States website. Each visit may be a sequence of actions in terms of the sections the users edit, as previously described. In order to answer the last question above, the following selling related information may be collected based on the analysts' recommendations.

Seller segment
User gender
Years being an eBay user
Selling category

FIG. 7B shows the generated visualization 700b. In some embodiments, most users may follow the default ordering and fill in most of the sections on the Sell-Your-Item page. Although no cluster with very distinct patterns stands out, the visualization 700b effectively shows the variation in the data, and interesting behavior patterns may be identified and pointed out. For example, the patterns included in box 710 may indicate that users start filling out the page by uploading pictures rather than editing the title. There may also be patterns in which certain actions are not performed. For example, the patterns in box 720 may indicate that users do not upload pictures, and the patterns in box 730 may indicate that users do not write a description. Analysts may then investigate in what scenarios such behaviors happen in order to infer potential causes. They may conduct such analysis by selecting the patterns of interests one by one and investigating corresponding summary statistics.

Figure 9:
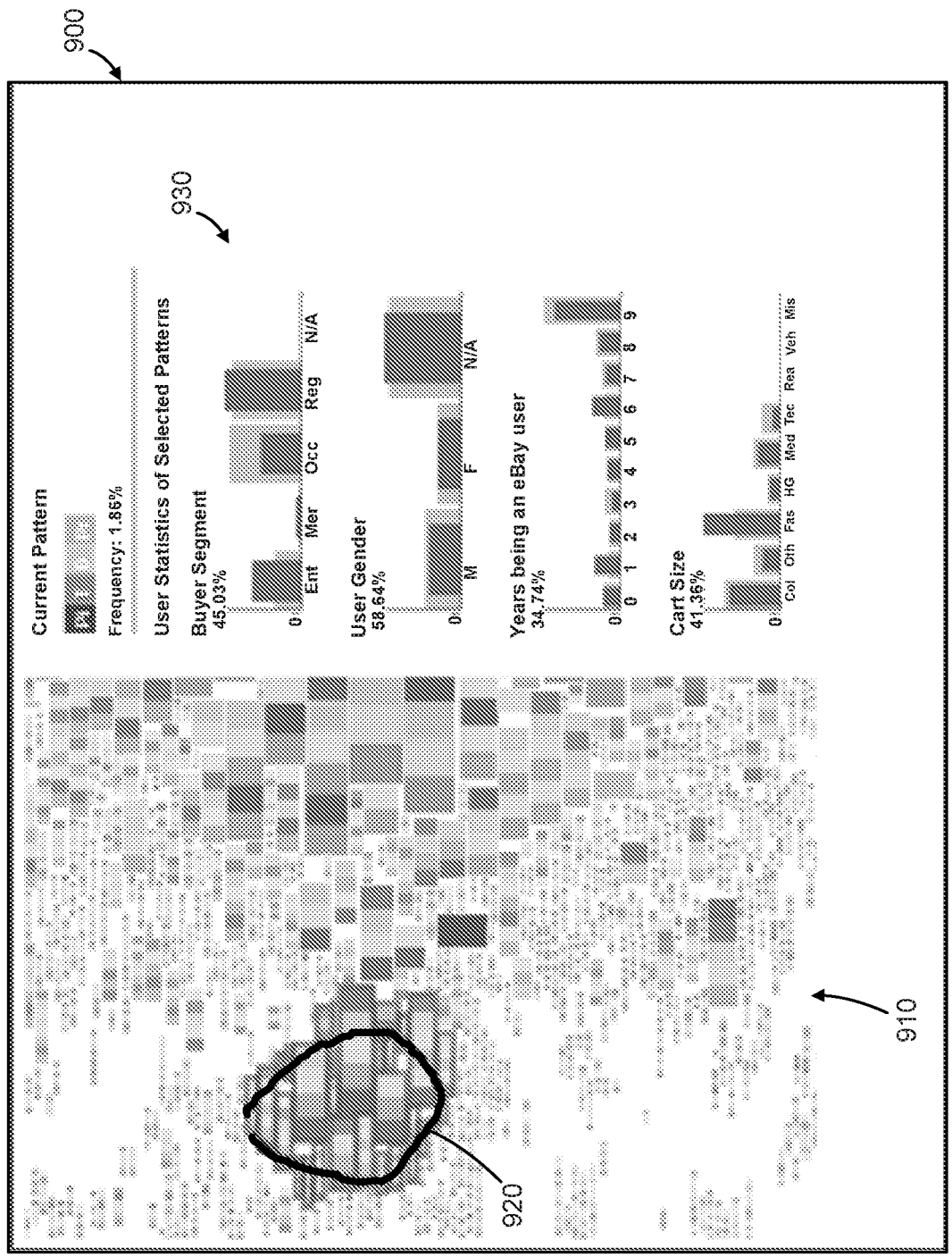
FIG. 9 illustrates clickstream patterns with pictures uploaded first, in accordance with some embodiments.

In one example, analysts may notice in the visualization 700b that a significant number of clickstreams start by uploading pictures rather than editing the title. They may consider this interesting, because the title may be one of the most critical parts of a listing on eBay, and the title input box may be placed at the beginning of the page. By selecting these clickstreams, an analyst can inspect related demographics and selling information on the side, as shown in FIG. 9. FIG. 9 illustrates a user interface 900 displaying a visualization 910 of clickstream patterns with pictures uploaded first, in accordance with some embodiments. In FIG. 9, the analyst has selected a portion 920 of the clickstreams in the visualization 910. Additional information 930 about this selected portion 920 of clickstreams may be displayed on the side. In some embodiments, the additional information 930 comprises statistical information about the clickstreams. This additional information 930 may include, but is not limited to demographics and selling information. It is contemplated that other types of information are also within the scope of the present disclosure.

Figure 10:
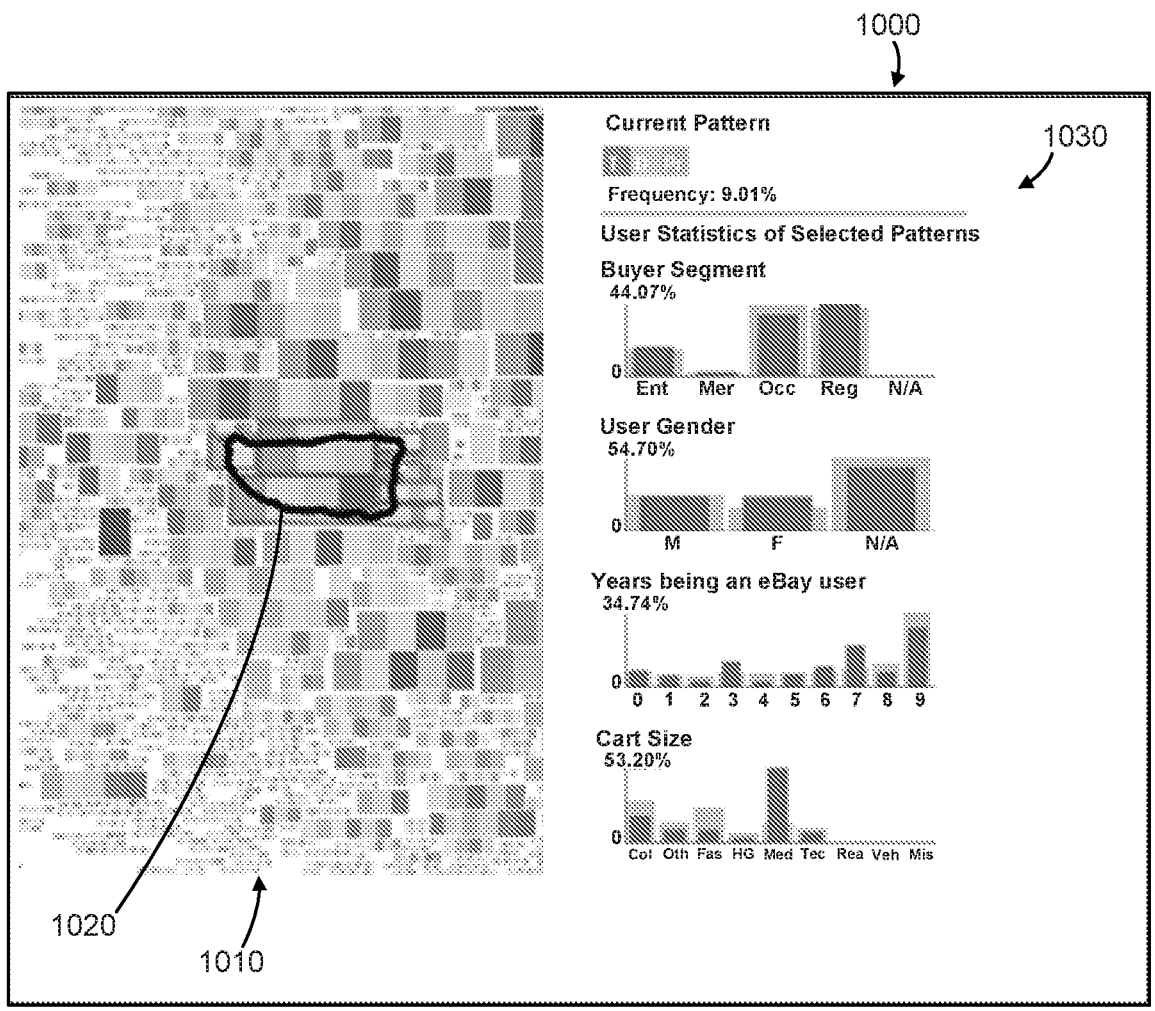
FIG. 10 illustrates clickstream patterns that do not include uploading a picture, in accordance with some embodiments.
Figure 11:
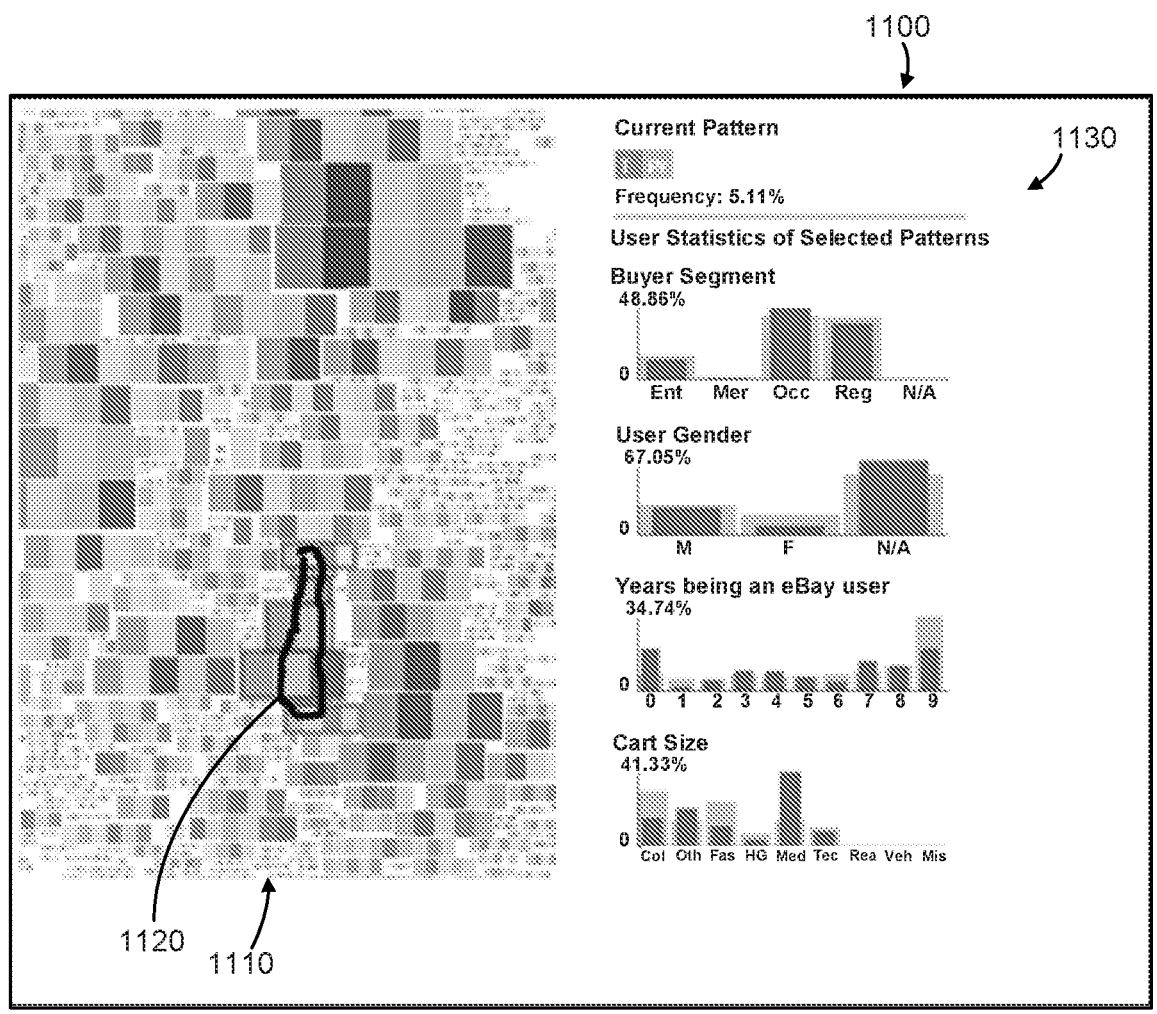
FIG. 11 illustrates clickstream patterns without uploading a picture or writing a description, in accordance with some embodiments.

The analysts may determine that, compared to the average category distribution in the data, these activities are more likely to happen in the Fashion category. One possible explanation may be that pictures are very important for selling clothes or shoes. FIGS. 9, 10, 11 show only part of the visualization that contains the clickstreams of interest and the statistics summary panel for illustration purposes. The statistical information on the side of the visualization may reveal that such activities are more likely to happen in the Fashion category and less likely in the Tech category compared to the selling category distribution of the entire dataset. The analysts may consider this to be reasonable because pictures are generally more effective than text in describing clothes and shoes.

Next, the analysts may investigate the scenario where users do not upload a picture. FIG. 10 illustrates a user interface 1000 showing an investigation of clickstream patterns 1020 of visualization 1010 that do not include uploading a picture, in accordance with some embodiments. Additional information 1030 about these clickstream patterns 1020 may be displayed on the side. In some embodiments, the additional information 1030 comprises statistical information about the clickstreams. This additional information 1030 may include, but is not limited to demographics and selling information. It is contemplated that other types of information are also within the scope of the present disclosure.

In FIG. 10, the activities corresponding to these clickstream patterns may most likely happen in the Media category, which may have a complete catalog, and default pictures of products may often be provided to users during listing. It may turn out that the majority of this behavior happens in the Media category, which may include books, CDs, DVDs, and etc. For such products, a pre-filled Sell-Your-Item page with standard product pictures may often be provided by eBay, while others may not, e.g., clothes in the Fashion category and antiques in the Collectibles category. Therefore, most users may use the provided product pictures instead of uploading their own. Before the study, the analysts may have thought that user behavior during listing could correlate with various characteristics of the users and listings. Therefore, they may recommend that seller segments, gender, years being a eBay user, and selling category be included for study. These findings may suggest that, among these factors, the selling category may be most correlated to user behavior.

The analysts may continue to examine other clickstream patterns that do not contain picture uploads. They may notice that a large number of users not only do not upload a picture, but also skip the description section. FIG. 11 illustrates a user interface 1100 showing an investigation of clickstream patterns 1120 of visualization 1110 without uploading a picture or writing a description, in accordance with some embodiments. Additional information 1130 about these clickstream patterns 1120 may be displayed on the side. In some embodiments, the additional information 1130 comprises statistical information about the clickstreams. This additional information 1130 may include, but is not limited to demographics and selling information. It is contemplated that other types of information are also within the scope of the present disclosure. The additional information 1130 may indicate that the corresponding users are less experienced, and might not understand the importance of the item descriptions for selling on eBay. For a listing on eBay, users may be encouraged to write a detailed description of the items they are selling. These listings may also be more likely to belong to the Media category. However, the analysts may observe that the distribution of years being an eBay user is different from that of the group selected in FIG. 10. These users are less experienced. The analysts' intuition may be that these inexperienced users have not learned the importance of descriptions in selling. Based on this observation, the analysts may consider providing more explicit messaging on the Sell-Your-Item page to encourage especially the inexperienced users to write a description.

Figure 12:
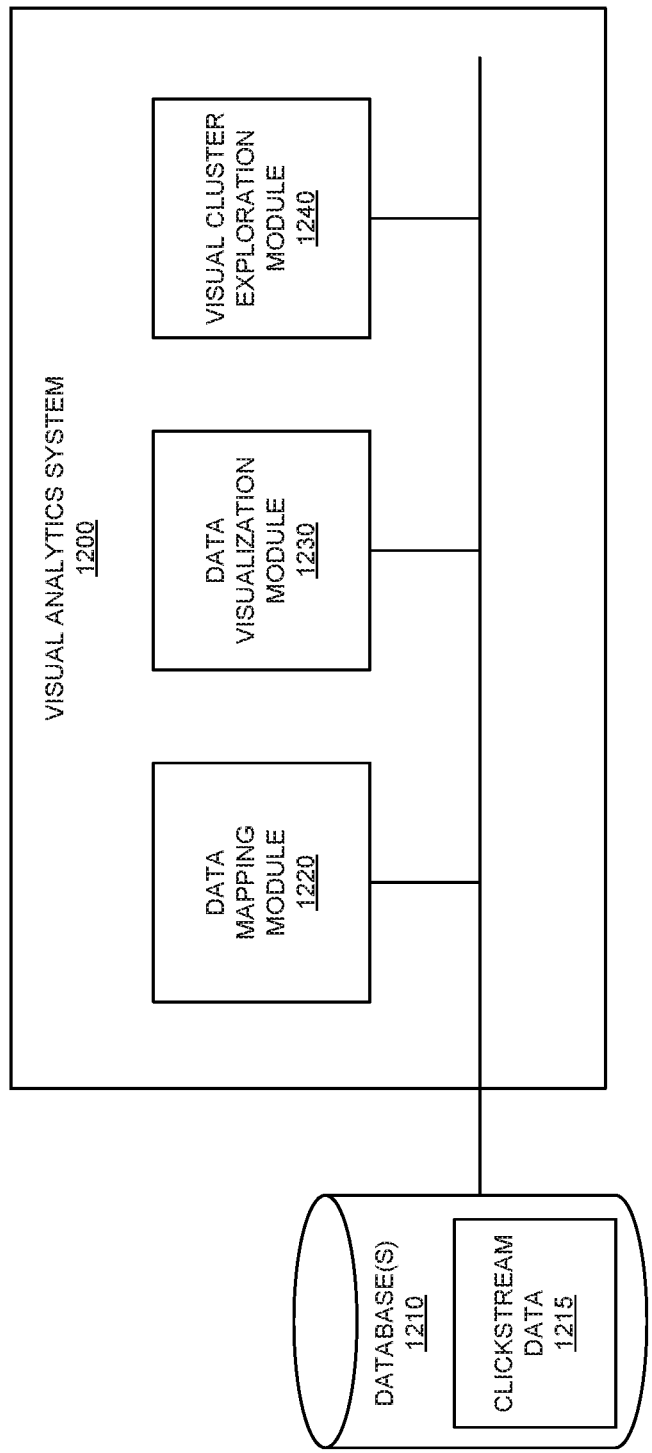
FIG. 12 is a block diagram illustrating a visual analytics system, in accordance with an example embodiment.

FIG. 12 is a block diagram illustrating a visual analytics system 1200, in accordance with an example embodiment. The visual analytics system 1200 may be employed to perform the functions disclosed herein. In some embodiments, the visual analytics system 1200 may reside on application server(s) 118 in FIG. 1. However, it is contemplated that other configurations are also within the scope of the present disclosure. In some embodiments, the visual analytics system 1200 may comprise a data mapping module 1220, a data visualization module 1230, and a visual cluster exploration module 1240.

The data mapping module 1220 may be configured to perform any of the data mapping functions disclosed herein (e.g., the functions described in the "DATA MAPPING AND CLUSTERING" section). In some embodiments, the data mapping module 1220 may be configured to receive clickstream data 1215 from one or more databases 1210, and to map the clickstream data 1215 to a 2-D plane. In some embodiments, database(s) 1210 may be incorporated into database(s) 126 in FIG. 1. However, it is contemplated that other configurations are within the scope of the present disclosure. Each clickstream may represent a corresponding sequence of user actions. In some embodiments, the data mapping module 1220 may be configured to apply an SOM with a probability model to the clickstream data 1215. In some embodiments, the probability model may comprise a Markov chain.

The data visualization module 1230 may be configured to perform any of the data visualization functions disclosed herein (e.g., the functions described in the "VISUALIZATION" section). In some embodiments, the data visualization module 1230 may be configured to receive the mapped clickstreams from the data mapping module 1220. The data visualization module 1230 may be configured to cause a visual representation of each clickstream to be displayed on a device (e.g., a computer). Each visual representation may comprise a distinct graphical element for each user action of the corresponding clickstream, and each visual representation may be configured to indicate a frequency level of the corresponding clickstream. In some embodiments, each distinct graphical element may comprise a geometric shape and a corresponding color that distinctly represents the corresponding user action. In some embodiments, the geometric shape may be a rectangle. However, it is contemplated that other geometric shapes are also within the scope of the present disclosure. In some embodiments, graphical elements of each visual representation may comprise a size that is proportional to the frequency level of the corresponding clickstream.

The visual cluster exploration module 1240 may be configured to perform any of the visual cluster exploration functions disclosed herein (e.g., the functions described in the "INTERACTIVE EXPLORATION" section). In some embodiments, the visual cluster exploration module 1240 may be configured to receive an indication of a selection of one or more of the visual representations, and to cause additional information about the clickstream(s) corresponding to the visual representation(s) to be displayed on a device.

Figure 13:
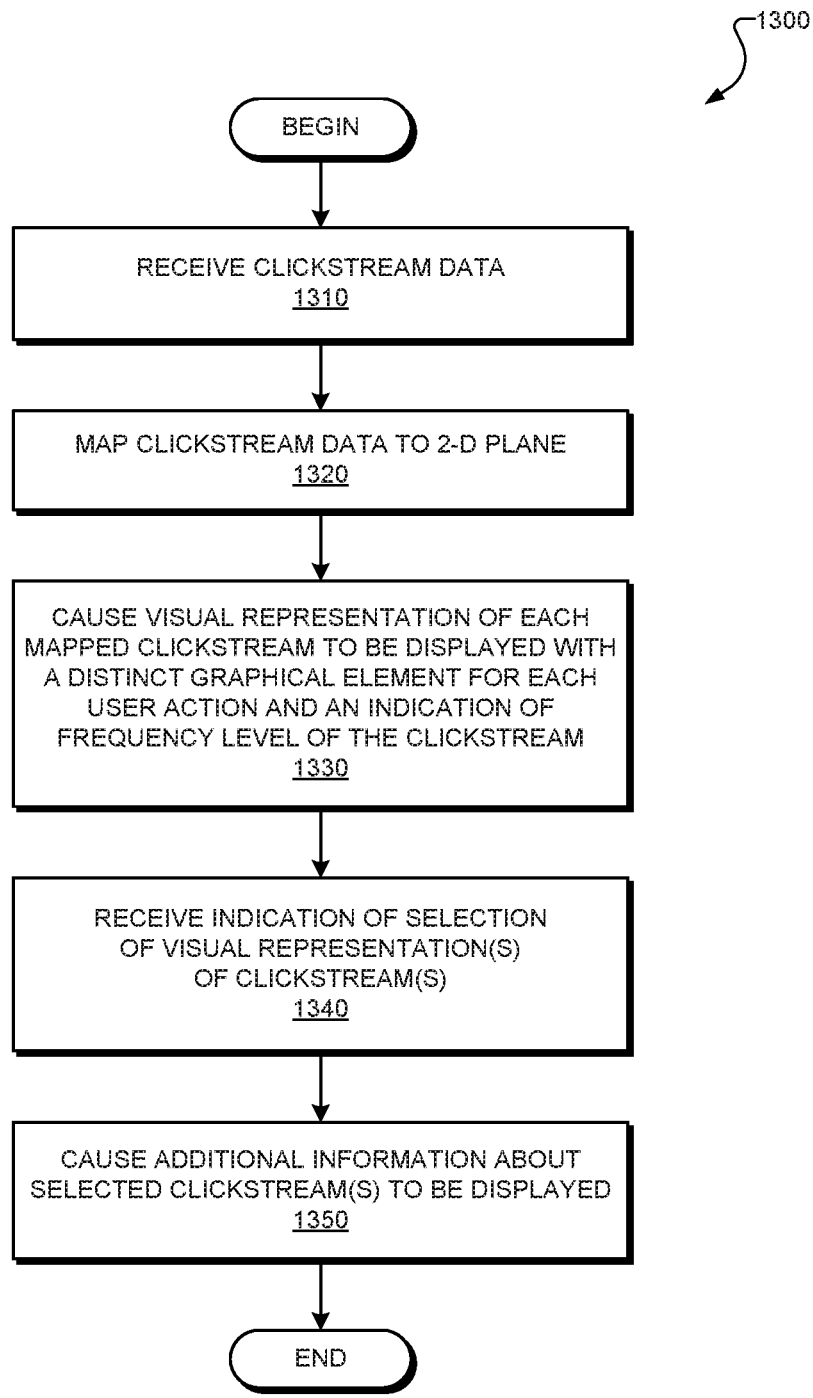
FIG. 13 is a flowchart illustrating a method of visual mining of user behavioral patterns, in accordance with an example embodiment.

FIG. 13 is a flowchart illustrating a method 1300 of visual mining of user behavioral patterns, in accordance with an example embodiment. It is contemplated that the operations of method 1300 may be performed by a system (e.g., visual analytics system 1200 in FIG. 12) or modules of a system (e.g., data mapping module 1220, data visualization module 1230, and visual cluster exploration module 1240 in FIG. 12). At operation 1310, clickstream data may be received. Each clickstream may represent a corresponding sequence of user actions. At operation 1320, the clickstream data may be mapped to a 2-D plane. In some embodiments, mapping the clickstream data to a two-dimensional plane may comprise applying an SOM with a probability model to the clickstream data. In some embodiments, the probability model may comprise a Markov chain. At operation 1330, a visual representation of each mapped clickstream may be displayed on a device. Each visual representation may comprise a distinct graphical element for each user action of the corresponding clickstream, and each visual representation may be configured to indicate a frequency level of the corresponding clickstream. At operation 1340, an indication of one or more selections of one or more visual representations of clickstreams may be received. At operation 1350, additional information about the selected clickstream(s) may be caused to be displayed. In some embodiments, the additional information may comprise statistical information. It is contemplated that any of the other features described within the present disclosure may be incorporated into method 1300.

The present disclosure introduces a visual cluster exploration approach to analyze valuable web clickstream data. This approach maps the heterogeneous clickstreams in a 2D space, visualizes representative data samples, and enables user-guided data exploration and clustering. The visual exploration approach helps analysts uncover user behavior patterns, learn the pattern demographics, and make sense of the interrelationships between the patterns and their demographics. This knowledge will help managers make better business strategies, leading to better services. Additionally, this problem solving framework is not constrained to analyzing the web clickstream data. It can be extended to deal with a broader class of categorical sequences data in many other fields.

The present disclosure also introduces an interactive cluster analysis approach, such that experts can provide input to improve the clustering results. When the analyst starts the interactive cluster analysis, he or she can sketch loops to include clickstreams. All clickstreams in one loop belong to a group. This information may be fed into a semi-supervised K-means clustering algorithm. Not only can the final clustering results be presented in the visualization immediately, but they can also be exported to files for further analysis.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
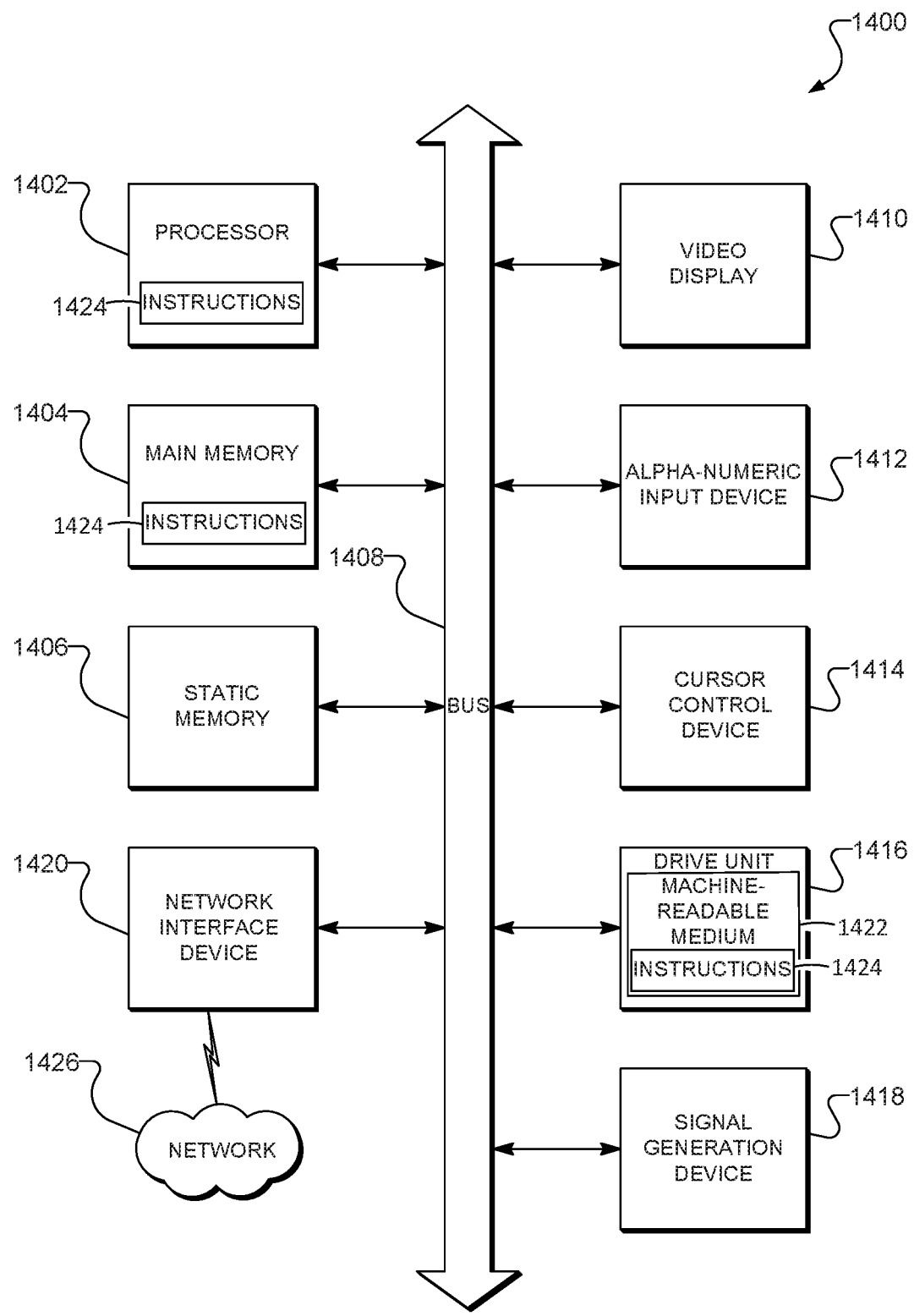
FIG. 14 shows a diagrammatic representation of a machine in the example form of a computer system within which a set of instructions may be executed to cause the machine to perform any one or more of the methodologies discussed herein, in accordance with some embodiments.

FIG. 14 is a block diagram of a machine in the example form of a computer system 1400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A visual data analytics method comprising:
   receiving, by an application server, a plurality of clickstreams associated with a user interaction with a website;
   iteratively training, by the application server using a competitive learning algorithm, a self-organizing map framework to obtain a set of trained vector prototypes representing clusters of clickstreams, wherein the plurality of clickstreams is represented in the self-organizing map framework by a set of user actions and probabilities associated with individual user actions, wherein the training includes, for individual vector prototypes:
  collecting a list of clickstreams that match the individual vector prototype based on a neighborhood size around the individual vector prototype;
  adjusting the individual vector prototype using the list of clickstreams; and
  decreasing the neighborhood size upon iteration;
generating, by the application server using the set of trained vector prototypes, a visual representation of a user behavior pattern; and
causing, by the application server, the visual representation of the user behavior pattern to be displayed on a device.

2. The method of claim 1,
wherein the plurality of clickstreams is represented in the self-organizing map framework by Markov chains, and wherein the competitive learning algorithm is an expectation-maximization algorithm.

3. The method of claim 1, wherein the self-organizing map framework includes a plurality of nodes, and wherein each node is associated with one of a plurality of vector prototypes representative of a data input.

4. The method of claim 1, wherein the plurality of clickstreams include data input and data upload in the user interaction with the website.

5. The method of claim 1, wherein the visual representation comprises a geometric shape and color used to represent a user action.

6. The method of claim 1, wherein a size of the visual representation is proportional to a frequency level of the plurality of clickstreams.

7. The method of claim 4, wherein the data input includes at least one of a color preference, an item type, and a pricing selection.

8. A computer system comprising:
  a computer processor circuit; and
  a computer memory circuit storing instructions that when executed by the computer processor circuit cause the computer system to perform operations including:
    receiving a plurality of clickstreams associated with a user interaction with a website;
    iteratively training, using a competitive learning algorithm, a self-organizing map framework to obtain a set of trained vector prototypes representing clusters of clickstreams, wherein the plurality of clickstreams is represented in the self-organizing map framework by a set of user actions and probabilities associated with individual user actions, wherein the training includes, for individual vector prototypes:
      collecting a list of clickstreams that match the individual vector prototype based on a neighborhood size around the individual vector prototype;
      adjusting the individual vector prototype using the list of clickstreams; and
      decreasing the neighborhood size upon iteration;
    generating a visual representation of a user behavior pattern using the set of trained vector prototypes; and
    causing the visual representation of the user behavior pattern to be displayed on a device.

9. The computer system of claim 8, wherein the operations further include:
  wherein the plurality of clickstreams is represented in the self-organizing map framework by Markov chains, and wherein the competitive learning algorithm is an expectation-maximization algorithm.

10. The computer system of claim 8, wherein the self-organizing map framework includes a plurality of nodes, and wherein each node is associated with one of a plurality of vector prototypes representative of a data input.

11. The computer system of claim 8, wherein the plurality of clickstreams include data input and data upload in the user interaction with the website.

12. The computer system of claim 8, wherein the visual representation comprises a geometric shape and color used to represent a user action.

13. The computer system of claim 8, wherein a size of the visual representation is proportional to a frequency level of the plurality of clickstreams.

14. The computer system of claim 11, wherein the data input includes at least one of a color preference, an item type, and a pricing selection.

15. A non-transitory machine-readable medium having stored thereon machine-readable instructions executable to cause a computer system to perform operations comprising:
  receiving a plurality of clickstreams associated with a user interaction with a website;
  iteratively training, using a competitive learning algorithm, a self-organizing map framework to obtain a set of trained vector prototypes representing clusters of clickstreams, wherein the plurality of clickstreams is represented in the self-organizing map framework by a set of user actions and probabilities associated with individual user actions, wherein the training includes, for individual vector prototypes:
    collecting a list of clickstreams that match the individual vector prototype based on a neighborhood size around the individual vector prototype;
    adjusting the individual vector prototype using the list of clickstreams; and
    decreasing the neighborhood size upon iteration;
  generating a visual representation of a user behavior pattern using the set of trained vector prototypes; and
  causing the visual representation of the user behavior pattern to be displayed on a device.

16. The non-transitory machine-readable medium of claim 15, wherein the operations further include:
  wherein the plurality of clickstreams is represented in the self-organizing map framework by Markov chains, and wherein the competitive learning algorithm is an expectation-maximization algorithm.

17. The non-transitory machine-readable medium of claim 15, wherein the self-organizing map framework includes a plurality of nodes, and wherein each node is associated with one of a plurality of vector prototypes representative of a data input.

18. The non-transitory machine-readable medium of claim 15, wherein the plurality of clickstreams include data input and data upload in the user interaction with the website.

19. The non-transitory machine-readable medium of claim 15, wherein the visual representation comprises a geometric shape to represent a user action.

20. The non-transitory machine-readable medium of claim 18, wherein the data input includes at least one of a color preference, an item type, and a pricing selection.

* * * * *